US012270512B2

(12) United States Patent
Yim et al.

(10) Patent No.: US 12,270,512 B2
(45) Date of Patent: Apr. 8, 2025

(54) CORNER STRUCTURE AND LIQUEFIED GAS STORAGE TANK HAVING SAME

(71) Applicant: KOREA GAS CORPORATION, Daegu (KR)

(72) Inventors: Ki Ho Yim, Seoul (KR); Hae Chul Han, Incheon (KR); Young Chul Yang, Gyeonggi-do (KR); Heung Seok Seo, Gyeonggi-do (KR); Youngkyun Kim, Incheon (KR); Kyo Kook Jin, Incheon (KR); Youngkeun Yoon, Incheon (KR)

(73) Assignee: KOREA GAS CORPORATION, Daegu (KR)

( * ) Notice: Subject to any disclaimer, the term of this patent is extended or adjusted under 35 U.S.C. 154(b) by 0 days.

(21) Appl. No.: 18/036,887

(22) PCT Filed: Jul. 22, 2021

(86) PCT No.: PCT/KR2021/009472
§ 371 (c)(1),
(2) Date: May 14, 2023

(87) PCT Pub. No.: WO2022/270675
PCT Pub. Date: Dec. 29, 2022

(65) Prior Publication Data

US 2024/0019081 A1 Jan. 18, 2024

(30) Foreign Application Priority Data

Jun. 23, 2021 (KR) ........................ 10-2021-0081444

(51) Int. Cl.
*F17C 3/02* (2006.01)
*B63B 25/16* (2006.01)
*F17C 3/06* (2006.01)

(52) U.S. Cl.
CPC ................ *F17C 3/06* (2013.01); *B63B 25/16* (2013.01); *F17C 3/027* (2013.01);
(Continued)

(58) Field of Classification Search
None
See application file for complete search history.

(56) References Cited

U.S. PATENT DOCUMENTS 6,374,761 B1 * 4/2002 Dhellemmes ......... F17C 13/001 220/901
7,717,288 B2 * 5/2010 Yang ....................... B63B 25/14 220/560.07

(Continued)

FOREIGN PATENT DOCUMENTS

JP H07217796 8/1995
KR 1020140019458 2/2014

(Continued)

OTHER PUBLICATIONS

"Office Action of Korea Counterpart Application", issued on May 21, 2022, p. 1-p. 6.

*Primary Examiner* — Mollie Impink
(74) *Attorney, Agent, or Firm* — JCIPRNET

(57) ABSTRACT

Disclosed is a corner structure (100) of a liquefied gas storage tank, wherein the corner structure is installed at a corner of a storage tank for loading liquefied gas and supports sealing walls (51, 52) that prevent leakage of the liquefied gas. The corner structure (100) may include: two insulation members (110) arranged on the inner surface of a hull structure so as to be oriented in different directions; and mobile members (130) which are installed on the respective insulation members (110) and to which the sealing walls (51, 52) are joined. The mobile members (130) may be slidably coupled to the insulation members 110, and a plurality of the (Continued)

mobile members (130) may be arranged spaced apart from each other in a straight line on one of the insulation members.

11 Claims, 14 Drawing Sheets

(52) U.S. Cl.
CPC ................. *F17C 2201/0157* (2013.01); *F17C 2203/0333* (2013.01); *F17C 2203/0624* (2013.01); *F17C 2203/0636* (2013.01); *F17C 2221/033* (2013.01); *F17C 2223/0161* (2013.01); *F17C 2260/044* (2013.01); *F17C 2270/0107* (2013.01)

(56) References Cited

U.S. PATENT DOCUMENTS

| | | | | |
|---|---|---|---|---|
| 11,674,643 | B2 * | 6/2023 | Sassi | F17C 3/04 141/1 |
| 2017/0159888 | A1 * | 6/2017 | Han | B63B 25/16 |

FOREIGN PATENT DOCUMENTS

| | | | |
|---|---|---|---|
| KR | 1020170104078 | 9/2017 | |
| KR | 1020200049963 | 5/2020 | |
| KR | 102248137 | 5/2021 | |
| WO | WO-2019012237 A1 * | 1/2019 | F17C 3/027 |
| WO | WO-2020039134 A1 * | 2/2020 | F17C 13/001 |

* cited by examiner (a)

(b)

(a)

(b)

CORNER STRUCTURE AND LIQUEFIED GAS STORAGE TANK HAVING SAME

TECHNICAL FIELD

The present disclosure relates to a corner structure of a liquefied gas storage tank, and more particularly, to a corner structure arranged to install a sealing wall at a corner portion of a liquefied gas storage tank for storing liquefied gas, which is a liquid in a cryogenic state.

BACKGROUND ART

In general, liquefied gas includes liquefied natural gas (LNG), liquefied petroleum gas (LPG), liquefied ethane gas, liquefied ethylene gas, liquefied nitrogen, liquefied carbon dioxide, liquefied ammonia, and the like.

For example, LNG is liquefied natural gas which is one of a fossil fuel, and LNG storage tanks are classified into onshore storage tanks installed on the ground or buried in the ground and mobile storage tanks installed in transportation vehicles, such as cars and vessels, depending on locations where the LNG storage tanks are installed.

Liquefied gases, such as LNG and LPG described above have a risk of explosion when exposed to impact and are stored in a cryogenic state, and thus, storage tanks for storing LNG or LPG have a structure in which impact resistance and fluid-tightness are firmly maintained.

Also, compared to onshore storage tanks with little mobility, liquefied gas storage tanks installed in vehicles and ships with mobility should take measures against mechanical stress caused by mobility. However, since a liquefied gas storage tank installed in a vessel equipped with countermeasures against mechanical stress may also be used for in an onshore storage tank, a structure of a liquefied gas storage tank installed in a vessel will be described as an example in this specification.

A vessel in which a storage tank for a liquefied gas, such as LNG, is installed usually has a dual structure hull including an outer wall forming the exterior and an inner wall formed inside the outer wall. The inner wall and the outer wall of the vessel may be connected by a connecting wall to be integrated, and in some cases, vessels may include a hull having a unitary structure without the inner wall.

Also, the inside of the hull, i.e., the inside of the inner wall, may be divided by one or more bulkheads. The bulkhead may be formed by a known cofferdam installed in a typical LNG carrier or the like.

Each of internal spaces divided by the bulkhead may be utilized as a storage tank storing cryogenic liquid, such as LNG.

Here, an inner circumferential wall surface of the storage tank is sealed in a fluid-tight state by a sealing wall. That is, the sealing wall forms one storage space by integrally connecting a plurality of metal plates to each other by welding, and accordingly, the storage tank may store and transport LNG without leakage.

This sealing wall is connected to the inner wall or bulkhead of the vessel by a plurality of anchor structures. Therefore, the sealing wall cannot be moved relative to the hull.

An insulating wall is disposed between the sealing wall and the inner wall or bulkhead to form an insulating layer. The insulating wall may include a corner structure disposed at a corner portion of the storage tank, an anchor structure disposed around the anchor member, and a planar structure disposed at a flat portion of the storage tank. That is, the overall insulating layer may be formed in the storage tank by the corner structure, the anchor structure, and the planar structure.

Here, the anchor structure includes an anchor member directly connecting and fixing the hull to the sealing wall and an insulating member installed around the anchor member.

In addition, the sealing wall is mainly supported by the anchor structure, and the planar structure only supports a load of LNG applied to the sealing wall, and there is no direct coupling between the planar structure and the anchor structure.

FIG. 1 is a cross-sectional view illustrating a portion of a corner of an LNG storage tank according to the related art.

In a related art LNG storage tank 10 shown in FIG. 1, secondary insulating walls 22, 32, and 42 and primary insulating walls 24, 34, and 44 are sequentially installed on an inner wall 12 or a bulkhead 14, which is a hull structure, to insulate the inside and outside of the storage tank. In addition, secondary sealing walls 23, 33, and 43 are installed between the secondary insulating walls 22, 32, 42 and the primary insulating walls 24, 34, and 44, and a primary sealing wall 50 is installed on surfaces of the primary insulating walls 24, 34, and 44 to seal the inside and outside of the storage tank doubly.

The LNG storage tank 10 configured as described above includes a corner structure 20 installed at an inner corner portion, an anchor structure 30 installed at regular intervals on a bottom surface, and a planar structure 40 disposed between the corner structure 20 and the anchor structure 30 or between the anchor structure 30 and the anchor structure 30 and slidably movable. Here, the corner structure 20, the anchor structure 30, and the planar structure 40 may be prefabricated as respective unit modules and then assembled to the storage tank 10, and the primary sealing wall 50 may be installed thereon to fluid-tightly sealing the insulating wall, thereby providing a space in which the LNG may be stored therein.

As shown in FIG. 1, the corner structure 20, the anchor structure 30, and the planar structure 40 may include primary insulating walls 24, 34, and 44, secondary insulating walls 22, 32, and 42, and secondary sealing walls 23, 33, and 43.

Meanwhile, in each of the structures 20, 30, and 40, a secondary sealing wall of each unit module and a contact surface of each insulating wall may be bonded to each other by an adhesive to be integrally formed. Typically, the secondary insulating walls 22, 32, and 42 include polyurethane foam, which is an insulation material, and a plate material adhered to a lower portion thereof. And, the primary insulating walls 24, 34, 44 are formed of polyurethane foam and a plate material adhered thereto by an adhesive. In addition, the primary sealing wall is installed on top of the primary insulating walls 24, 34, 44 and fixed to the anchor structure 30 by welding.

In addition, a flange 42*a* larger than the secondary insulating wall 42 is formed at a lower end of the secondary insulating wall 42 of the planar structure 40. The flange 42*a* is inserted into a recess formed at a lower end of the anchor structure 30 and is installed to be slidably movable.

In the illustrated example, each anchor structure 30 has an anchor support rod 36, a fixing member 37 located at a lower portion, an anchor secondary insulating wall 32, and an anchor primary insulating wall 34, and a secondary sealing wall 33 is connected between the anchor secondary insulating wall 32 and the anchor primary insulating wall 34. One end of the anchor support rod 36 is connected to the primary sealing wall 50 and the other end thereof is connected to a hull inner wall 12 by the fixing member 37.

Meanwhile, in the anchor structure 30, the primary sealing wall 50 is welded and coupled to the upper end of the anchor support rod 36.

In addition, the anchor structure 30 is located at a connection point of adjacent planar structures 40 to connect them, and the planar structure 40 is fixed to the hull inner wall 12 or the bulkhead 14 forming the storage tank 10. In addition, the fixing member 37 of the anchor structure 30 is installed around the anchor support rod 36.

However, in the related art LNG storage tank, a configuration of the insulating wall structure includes primary and secondary insulating walls and a secondary sealing wall interposed therebetween, which is complicated. In addition, the structure for connecting the secondary sealing walls of each unit module to each other is complicated, and connection work is not easy. In addition, since the structure and installation work of a connection portion of an anchor portion or the secondary sealing wall are difficult, reliability of LNG sealing to the secondary sealing wall may be lowered, to cause leakage of LNG.

In addition, the related art corner structure 20, in which only a load of LNG applied to the sealing wall 50 is supported and the sealing wall 50 is not attached, there may be room for improvement in absorbing stress occurring during deformation of the hull or thermal deformation of the storage tank due to loading and unloading of LNG in a cryogenic state.

In recent years, as engine performance has improved, the consumption of boil-off gas has decreased, and demand for a lower boiler-off rate (BOR) has gradually increased. To this end, an increase in thickness of an insulating structure to increase the insulation performance may increase a weight and an increase in the amount of shrinkage of the insulating structure for sloshing impact, causing a problem in that a relative displacement between the sealing wall and the anchor structure further increases. For this reason, the reliability of LNG sealing in the sealing wall may be lowered to cause LNG leakage.

Therefore, it is necessary to continuously make efforts to improve work efficiency and reduce construction period and costs when manufacturing a storage tank by reducing the weight of each unit module, while maintaining the insulation performance of the insulating structure.

DISCLOSURE

Technical Problem

The present disclosure provides a corner structure of a liquefied gas storage tank having an improved structure, capable of simplifying a structure of an insulating wall and a sealing wall and a coupling structure thereof in the liquefied gas storage tank, improving work to be easy, increasing reliability of sealing, shortening a dry time of the tank by simplifying an assembly structure and a manufacturing process, and allowing a corner portion to more efficiently resolve mechanical stress occurring in the storage tank.

Technical Solution

According to an embodiment of the present disclosure, a corner structure of a liquefied gas storage tank installed at a corner of a storage tank for loading liquefied gas and supporting a sealing wall preventing leakage of liquefied gas, includes: two insulating members disposed on an inner surface of a hull structure wall to be oriented in different directions; and a movable member installed on each of the insulating members and to which the sealing wall is attached, wherein the movable member is coupled to be slidably displaced with respect to the insulating member, and a plurality of the movable members are arranged in a straight line at intervals from each other with respect to one insulating member.

The sealing wall may include a primary membrane and a secondary membrane, the movable member includes a primary joint portion to which the primary membrane is attached, a secondary joint portion formed to have a step difference from the primary joint portion, to which the secondary membrane is attached, and a flange portion extending from the secondary joint portion for coupling with the insulating member, wherein the flange portion is slidably interposed between upper plates of the insulating member formed of two sheets of plywood, so that the insulating member and the movable member may be combined to be relatively slidably displaceable.

The secondary joint portion and the flange portion may be formed by bending a sheet of metal, and the primary joint portion is formed by adhering a metal rod having a rectangular cross-section or a U-shaped section steel formed by bending a sheet of metal to the secondary joint portion.

The insulating member may include a lower plate and an upper plate having a flat plate shape; a lower insulator laminated on the lower plate; and an upper insulator interposed between the lower insulator and the upper plate, wherein the upper insulator and the lower insulator may be formed of an insulator of the same material.

The lower insulator may have a density lower than or equal to a density of the upper insulator.

The corner structure may further include a middle insulator disposed in a space surrounded by two insulating members oriented in different directions and the hull structure wall.

The middle insulator may have a density lower than or equal to a density of the upper insulator and the lower insulator.

The corner structure may further include: a curved member disposed between upper plates of the two insulating members to support the sealing wall and having a curved surface facing an inside of the storage tank.

The insulating member may include two upper plates, the movable member includes a joint portion to which the sealing wall is bonded and a flange portion extending from the joint portion, among the two upper plates, a first upper plate located on a lower side may include a concave portion in which the flange portion is seated, and a second upper plate located above the first upper plate may include an opening through which the joint portion passes, and the flange portion may be interposed between the first upper plate and the second upper plate in the concave portion.

A length and width of the concave portion may be greater than or equal to a length and width of the flange portion, and a length and width of the opening portion are greater than a length and width of the joint portion.

According to an embodiment of the present disclosure, there is provided a liquefied gas storage tank including a corner structure installed at a corner to support a sealing wall preventing leakage of liquefied gas, wherein the corner structure includes: two insulating members disposed on an inner surface of a hull structure wall to be oriented in different directions; and a movable member installed on each of the insulating members and to which the sealing wall is attached, wherein the movable member is coupled to be slidably displaced with respect to the insulating member, and a plurality of the movable members are arranged in a straight line at intervals from each other with respect to one insulating member.

A planar structure may be disposed around the corner structure, the planar structure may include a secondary insulating panel installed on the hull structure wall and a primary insulating panel adhered to the secondary insulating panel to be adjacent to the sealing wall, and the primary insulator included in the primary insulating panel and the secondary insulator included in the secondary insulating panel may be formed of an insulator of the same material, and the secondary insulator has a density lower than or equal to a density of the primary insulator.

The sealing wall may include a primary membrane in direct contact with liquefied gas and a secondary membrane installed to be spaced apart from the primary membrane by a predetermined distance, and a support plate may be interposed between the primary membrane and the secondary membrane to maintain a constant interval therebetween.

Advantageous Effects

As described above, according to the present disclosure, a corner structure of a liquefied gas storage tank having an improved structure, capable of simplifying a structure of an insulating wall and a sealing wall and a coupling structure thereof in the liquefied gas storage tank, improving work to be easy, increasing reliability of sealing, shortening a dry time of the tank by simplifying an assembly structure and a manufacturing process, and allowing a corner portion to more efficiently resolve mechanical stress occurring in the storage tank may be provided.

BEST MODE

Hereinafter, configuration and operation according to an embodiment of the present disclosure will be described in detail with reference to the drawings. In addition, the following embodiments may be modified into various other forms, and the scope of the present disclosure is not limited to the following embodiments.

In this specification, the expressions 'upper portion' and 'lower portion' are based on each corner structure or planar structure before being adhered to a structure wall of a hull to form a storage tank and are not based on the entire storage tank. Each corner structure or planar structure may be adhered not only to the bottom of the storage tank, but also to a ceiling and side walls. For example, when each corner structure or planar structure is adhered to the bottom of the storage tank, the 'upper portion' and 'lower portion' in each corner structure or planar structure have the same orientation as 'upper portion' and 'lower portion' in the entire storage tank, but when each corner structure or planar structure is adhered to the ceiling or side surface of the storage tank, the 'upper portion and the 'lower portion' of each corner structure or planar structure have different orientations from the 'upper portion and 'lower portion' of the entire storage tank.

Figure 1:
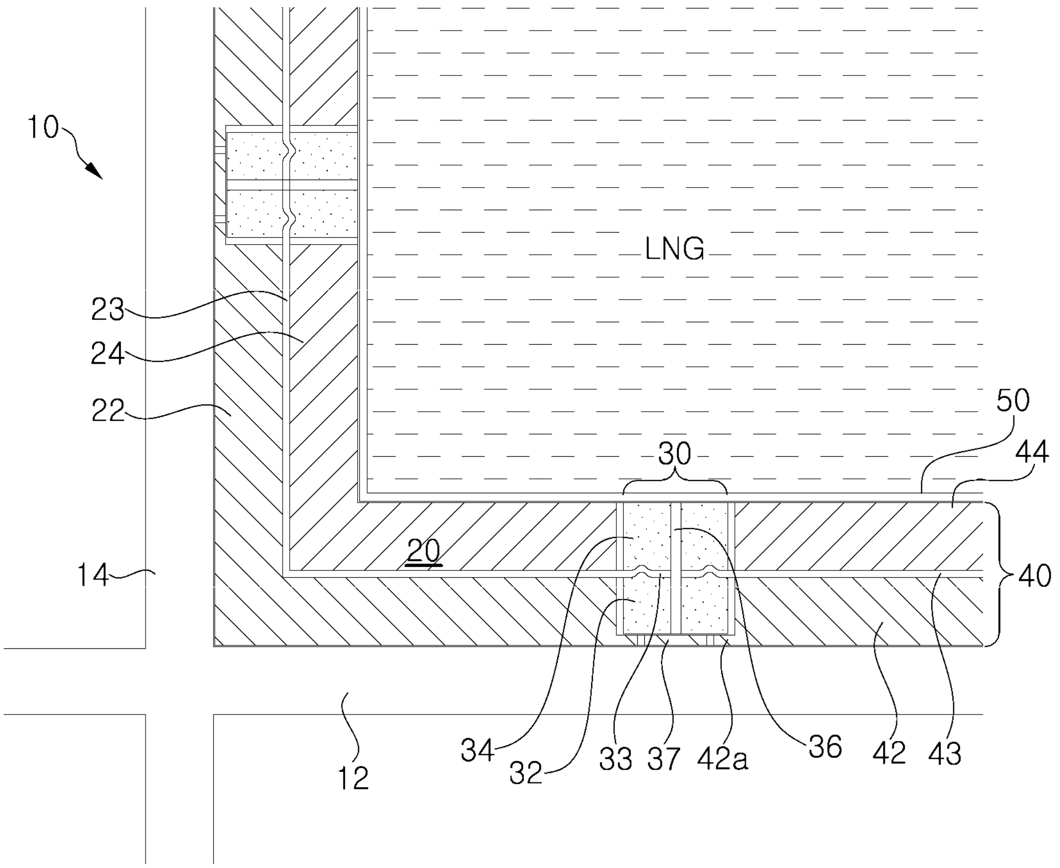
FIG. 1 is a cross-sectional view illustrating a portion of a storage tank for LNG according to the related art.

A liquefied gas storage tank formed by a corner structure 100 and a planar structure 300 according to an embodiment of the present disclosure includes an insulating wall and a sealing wall laminated the structure wall (hull; 12, 14) of a hull, like the storage tank described above with reference to FIG. 1. However, compared to the related art storage tank shown in FIG. 1 in which a secondary insulating wall, a secondary sealing wall, a primary insulating wall, and a primary sealing wall are sequentially alternately laminated, in the storage tank including the corner structure 100 and the planar structure 300 according to an embodiment of the present disclosure, a sealing wall is installed on an insulating wall and the sealing wall is not interposed between insulating walls. The insulating wall may be formed by arranging a plurality of modularized insulating structures (e.g., the corner structure 100, the planar structure 300, etc.) on the structure walls 12 and 14 of the hull.

Figure 2:
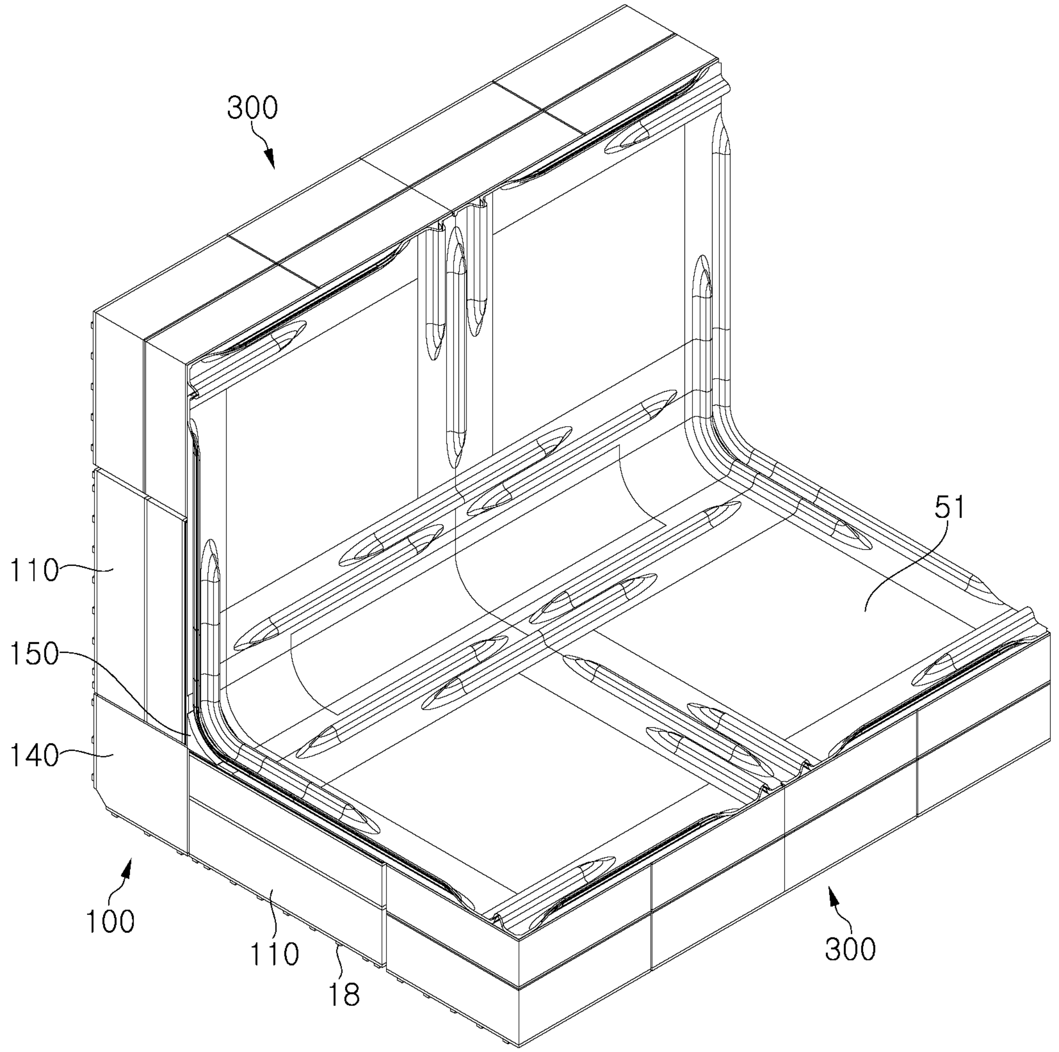
FIG. 2 is a perspective view of a corner structure according to an embodiment of the present disclosure, illustrating primary and secondary membranes and a portion of a planar structure together.
Figure 3:
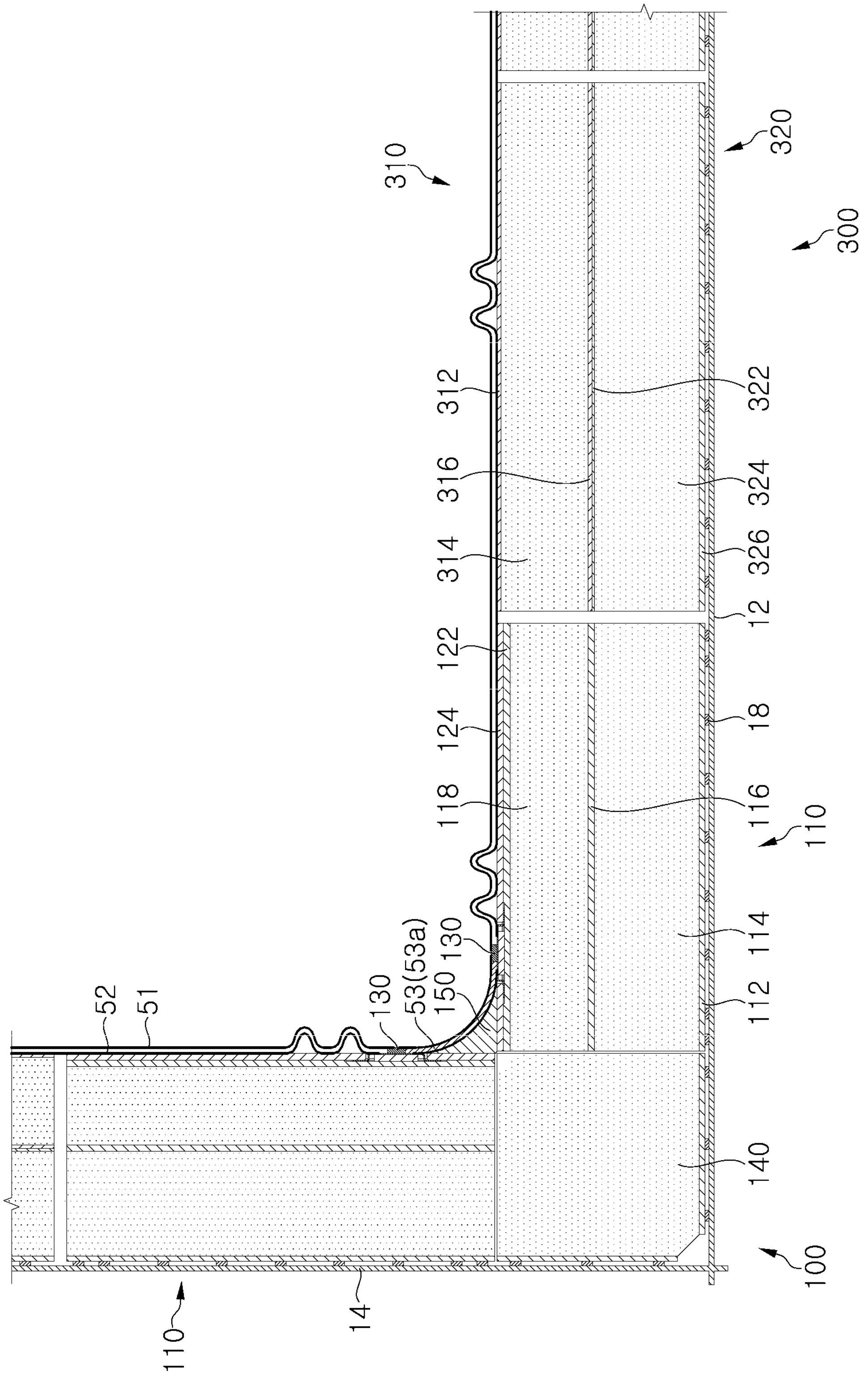
FIG. 3 is a cross-sectional view of a corner structure according to an embodiment of the present disclosure.

FIG. 2 is a perspective view of a corner structure according to an embodiment of the present disclosure, and FIG. 3 is a cross-sectional view taken along plane A-A of FIG. 2. FIG. 2 illustrates the corner structure 100 according to an embodiment of the present disclosure together with primary and secondary membranes 51 and 52 and a portion of a planar structure 300. The shapes of the first and secondary membranes 51 and 52 and the shape of the planar structure 300 are not limited to those illustrated.

As shown in FIGS. 2 and 3, the corner structure 100 according to an embodiment of the present disclosure includes an insulating member 110 disposed on a surface of a wall body partitioning an internal space of the hull so that the storage tank 10 (refer to FIG. 1) may be installed, that is, a hull structure wall, such as an inner wall 12 (refer to FIG. 1) or the blockhead 14 (refer to FIG. 1), and a movable member 130 supported on the insulating member 110 and to which membranes 51 and 51 for sealing are attached.

Here, the movable member 130, as will be described later, is installed to be finely displaceable with respect to the insulating member 110 when thermal deformation resulting from a change in temperature according to loading or unloading of liquefied natural gas (LNG) in a cryogenic state or deformation of the hull due to waves occurs. That is, the movable member 130 and the insulating member 110 are configured to be relatively displaceable with respect to each other.

According to an embodiment of the present disclosure, the insulating member 110 has a coupling structure with the movable member 130, but may be configured not to have a coupling structure with the hull structure walls 12 and 14. As will be described later, the insulating member 110 is only placed on the hull structure walls 12 and 14 with a mastic 18 interposed therebetween, and may not be coupled by a separate mechanical coupling structure.

Each insulating member 110 may be formed of, for example, a polyurethane foam insulator and plywood. However, the present disclosure is not limited by the material and structure of the insulating member 110 included in the corner structure 100.

Figure 14:
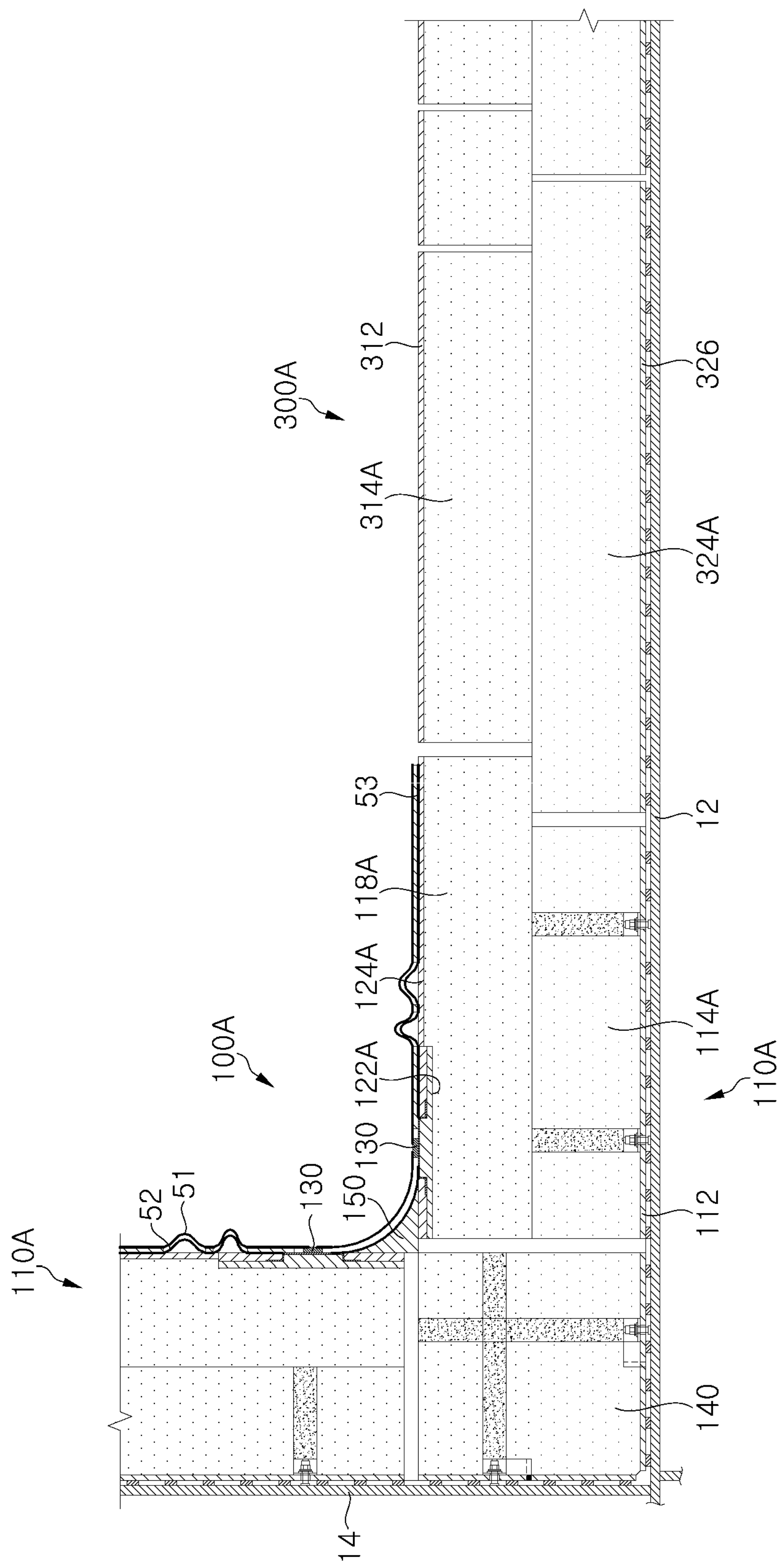
FIG. 14 is a cross-sectional view of a corner structure according to another embodiment of the present disclosure.
Figure 15:
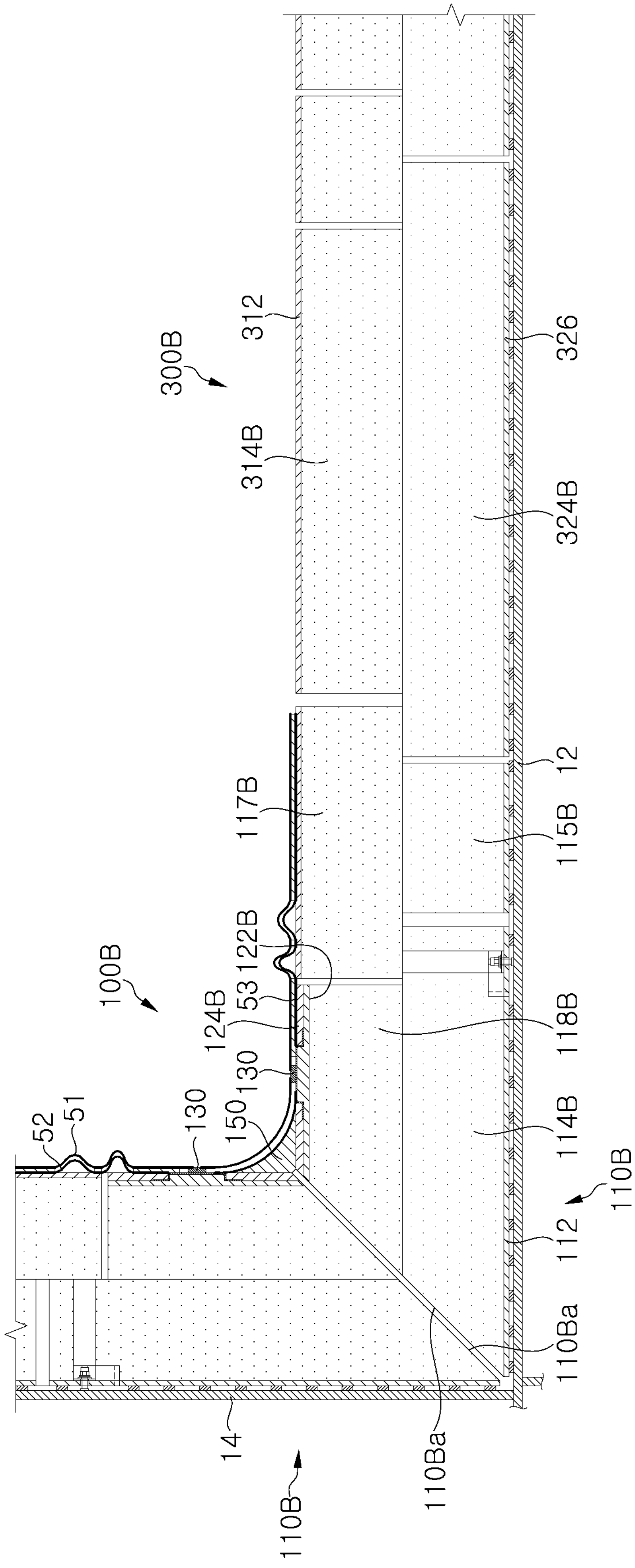
FIG. 15 is a cross-sectional view of a corner structure according to another embodiment of the present disclosure.

The insulating member 110 may include a lower plate 112, a lower insulator 114, an upper insulator 118, and upper plates 122 and 124. The lower plate 112 may be formed of one sheet of plywood, and the upper plates 122 and 124 may be formed of two sheets of plywood. The insulating member 110 may further include a middle plate 116 interposed between the lower insulator 114 and the upper insulator 118. In this case, the middle plate 116 may be formed of a single piece of plywood. FIGS. 3 to 8 show an insulating member 110 having a middle plate 116, and FIGS. 14 and 15 show insulating members 110A and 110B without a middle plate. Of course, the present disclosure is not limited by the presence or absence of the middle plate or the structure and shape of the insulating member.

The upper insulator 118 and the lower insulator 114 may be formed of the same material, for example, polyurethane foam (PUF) or reinforced-polyurethane foam (R-PUF), and the lower insulator 114 may be foam-molded to have a density value equal to or lower than that of the upper insulator 118. For example, the upper insulator 118 may have a density of 80 to 240 kg/$m^3$. The upper insulator 118, located relatively close to the cryogenic liquefied gas, is manufactured to have a relatively high density to improve insulation performance, and the lower insulator 114, located relatively far from the cryogenic liquefied gas (located closer to the hull structure wall side), is manufactured to have a relatively low density to reduce a weight of the insulating member 110. Therefore, it is possible to simultaneously achieve BOR improvement and weight reduction of the storage tank.

A protective layer (not shown) formed of glass wool may be laminated on a side surface of the insulating member 110 to protect the upper insulator 118 and the lower insulator 114.

Although not shown, when the lower insulator 114 is manufactured to have a relatively low density to the extent that strength reinforcement is required, the insulating member 110 may include one or more reinforcing plate (not shown) connecting the lower plate 112 to the middle plate 116 to reinforce the lower insulator 114. The reinforcing plate may be formed of plywood. When a plurality of reinforcing plates are installed in the lower insulator 114, the plurality of reinforcing plates may be arranged in parallel with each other. Depending on a size of the insulating member 110 or a density of the lower insulator 114, the number of installed reinforcing plates may vary.

In the above, in order to reinforce the lower insulator 114 of the insulating member 110, the use of reinforcing plates arranged in parallel has been illustrated, but variations may be made such that an insulating box formed of plywood is used or the reinforcing plates are arranged in a grid form, etc. In addition, the insulating member 110 may be formed of a single layer of insulator (i.e., the middle plate 116 is omitted), similar to the middle insulator 140 described below, instead of having a two-layer structure of an upper insulator and a lower insulator.

The mastic 18 may be interposed between the insulating member 110 and the hull structure walls 12 and 14. According to the corner structure 100 of the present embodiment, only the mastic 18 may be interposed between the insulating member 110 and the hull structure walls 12 and 14, and a fixing structure for fixing the insulating member 110 of the corner structure 100 to the hull structure walls 12 and 14, for example, mechanical fixing members, such as stud bolts and nuts, may not be provided.

The movable member 130 includes a primary joint portion 132 to which the primary membrane 51 is attached, a secondary joint portion 134 formed to have a step difference from the primary joint portion 132 and to which the secondary membrane 52 is attached, and a flange portion 136 extending from the secondary joint portion 134 for coupling with the insulating member 110. The flange portion 136 of the movable member 130 is slidably interposed between the upper plates 122 and 124 of the insulating member 110 formed of two plywoods, so that the insulating member 110 and the movable member 130 are connected.

For example, the secondary joint portion 134 and the flange portion 136 may be formed by bending a sheet of metal (for example, SUS having a thickness of 3t), and the primary joint portion 132 may be formed by adhering a metal rod having a rectangular cross-section (for example, SUS having a thickness of 13t) on the secondary joint portion 134.

As described above, the sealing membrane includes the primary membrane 51 forming a primary sealing wall, while directly contacting liquefied gas, and the secondary membrane 52 forming a secondary sealing wall. Each of the primary joint portion 132 and the secondary joint portion 134 may be provided in the movable member 130 so that the primary membrane 51 and the secondary membrane 52 may be joined at regular intervals, for example, by welding. A difference in height between the primary joint portion 132 and the secondary joint portion 134 may be set equal to a gap formed between the primary membrane 51 and the secondary membrane 52.

A support plate 53 may be interposed between the primary membrane 51 and the secondary membrane 52 to maintain a gap and support a load from cargo. The support plate 53 may be formed of plywood, for example.

In order for the corner structure 100 shown in FIGS. 2 and 3 to be installed in a corner portion at which two wall surfaces among a plurality of wall surfaces forming the storage tank are connected at an angle of 90 degrees, two insulating members 110 are arranged to be oriented at an angle of 90 degrees. When two of the plurality of wall surfaces forming the storage tank are connected at an angle (e.g., 30 degrees, 45 degrees, 60 degrees, 108 degrees, 116 degrees, 135 degrees, 270 degrees, etc.) other than 90 degrees, the insulating member may be oriented according to the angles. In the following description and drawings, a 90-degree corner structure is described as an example, but this is only an example and the present disclosure is not limited by the angle formed by the corner structure.

A space demarcated by the two insulating members 110 oriented in different directions and the hull structure walls 12 and 14 may be filled with the middle insulator 140 having a shape corresponding to the space. In FIGS. 2 and 3, a cross-sectional shape of the middle insulator 140 is approximately square, but the shape of the middle insulator may vary according to the angle formed by the two insulating members 110. The middle insulator 140 may be formed of PUF or R-PUF having a density of 40 to 240 kg/$m^3$, for example.

A gap between the insulating member 110 and the middle insulator 140 may be filled with an insulator, such as glass wool. Glass wool may have a density less than 90 kg/$m^3$, for example. Glass wool may have a density of 20 to 50 kg/$m^3$, for example.

Figure 4:
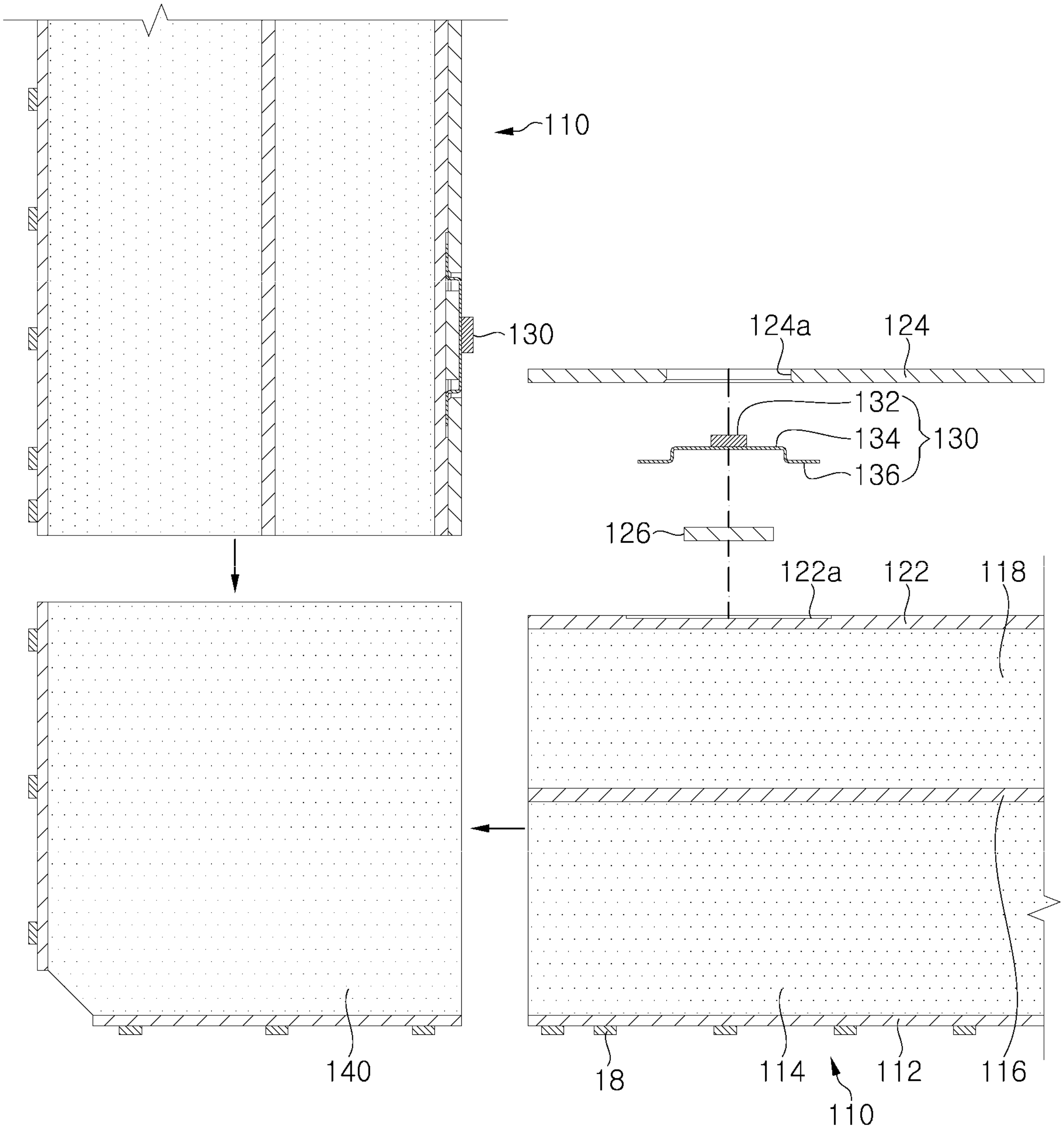
FIGS. 4 to 8 are cross-sectional views illustrating an assembly process of a corner structure according to an embodiment of the present disclosure.

A corner portion of the middle insulator 140, that is, the corner portion (an upper right corner portion of the middle insulator 140 in FIG. 4) of a portion in which the two insulating members 110 are adjacent may be chamfered to prevent damage.

The insulating member may have a modified structure to be fixed on the hull structure wall in a mechanical manner, for example, by using stud bolts and nuts. In addition, the insulating member may have a modified structure so as to be fixed by the adjacent planar structure 300.

The corner structure 100 according to an embodiment of the present disclosure may further include a curved member 150 having a curved surface facing the inside of the tank. The curved member 150 may be formed of, for example, PLW or high-density polyurethane foam (for example, PUF of 80 to 240 kg/$m^3$). Alternatively, the curved member 150 may be formed of, for example, an organic insulator having a cell structure. The curved member 150 is disposed between the upper plates 122 and 124 of the two insulating members 110 to support the membranes 51 and 52.

Figure 7:
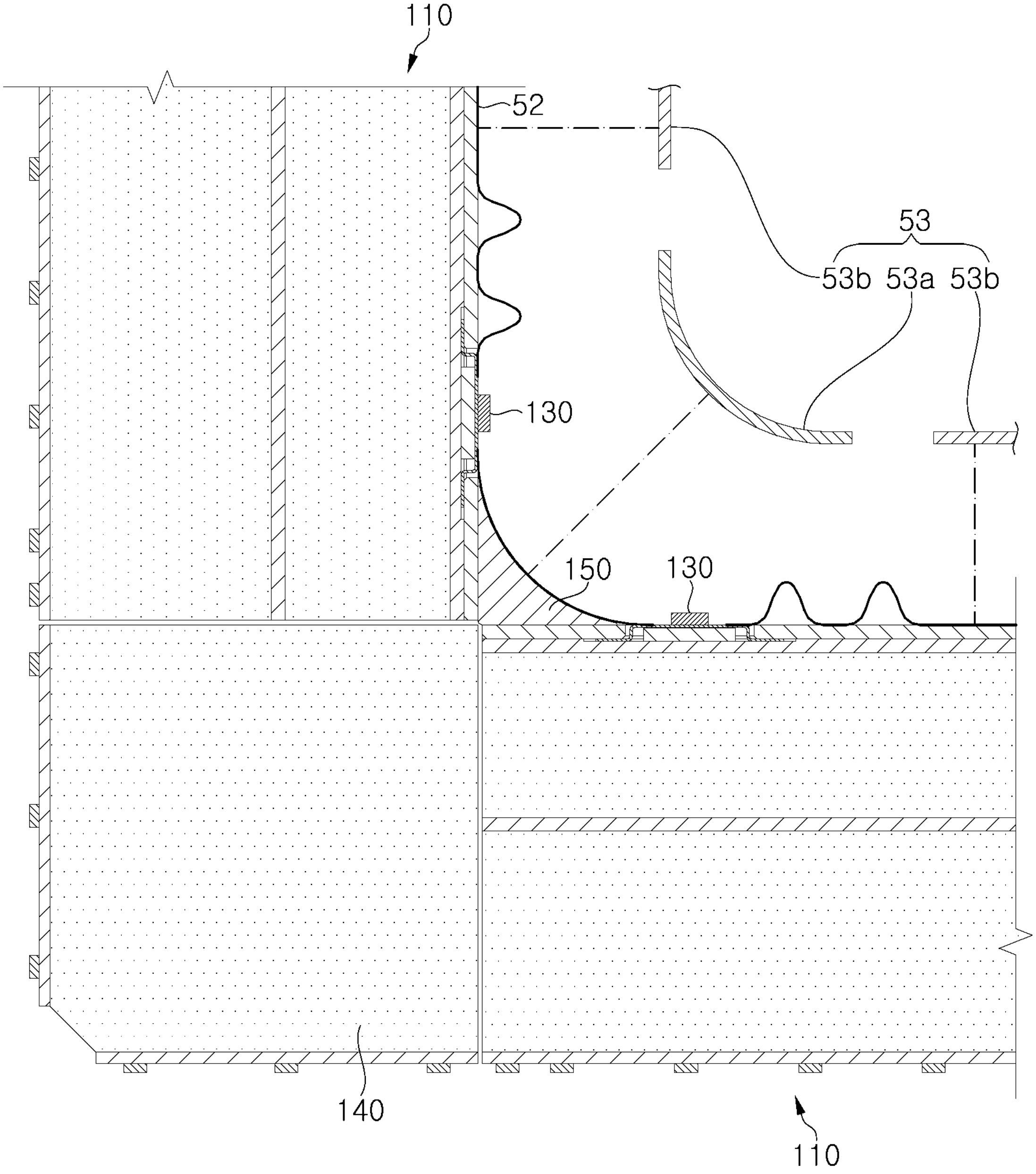
Figure 8:
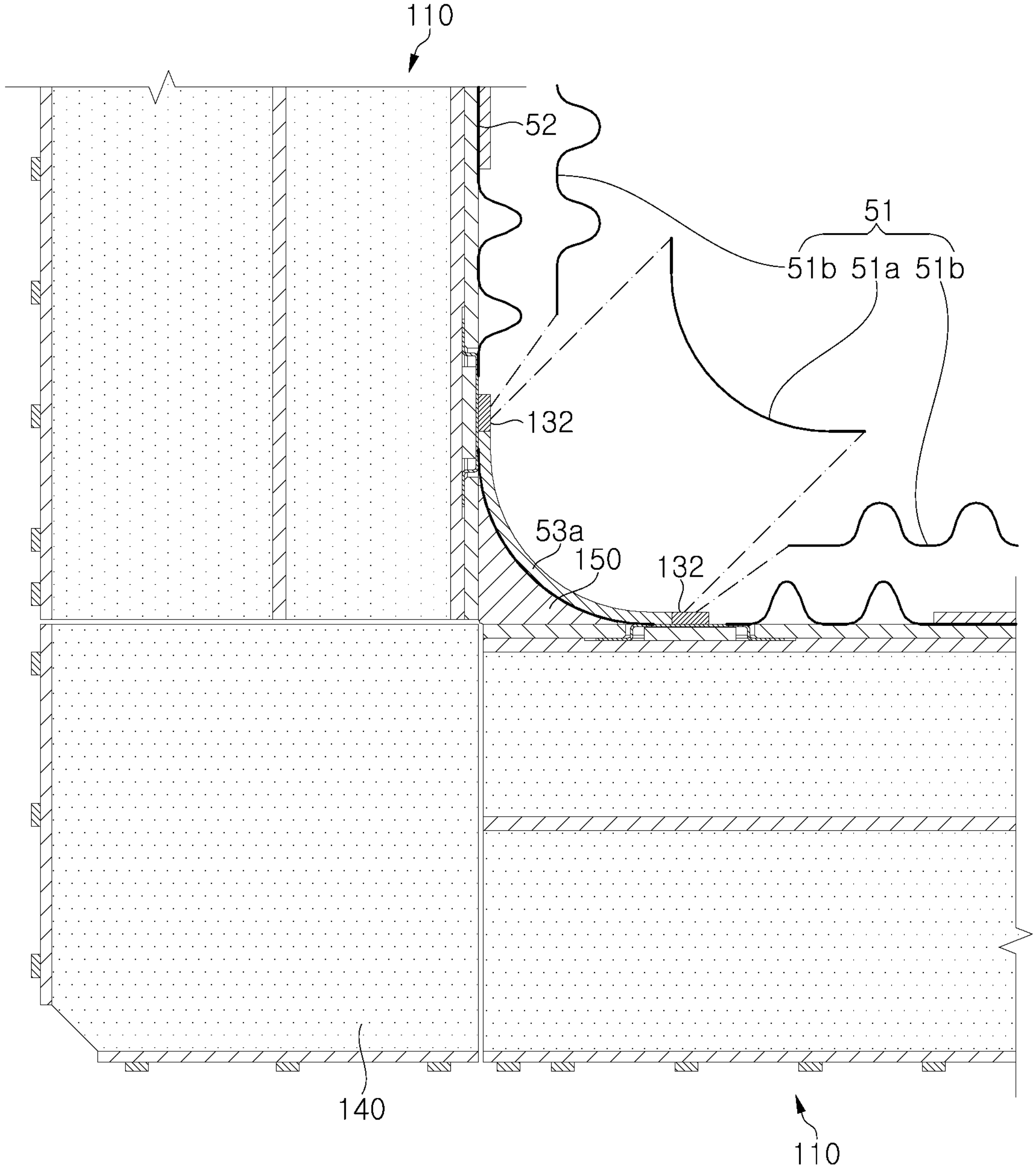
Figure 9:
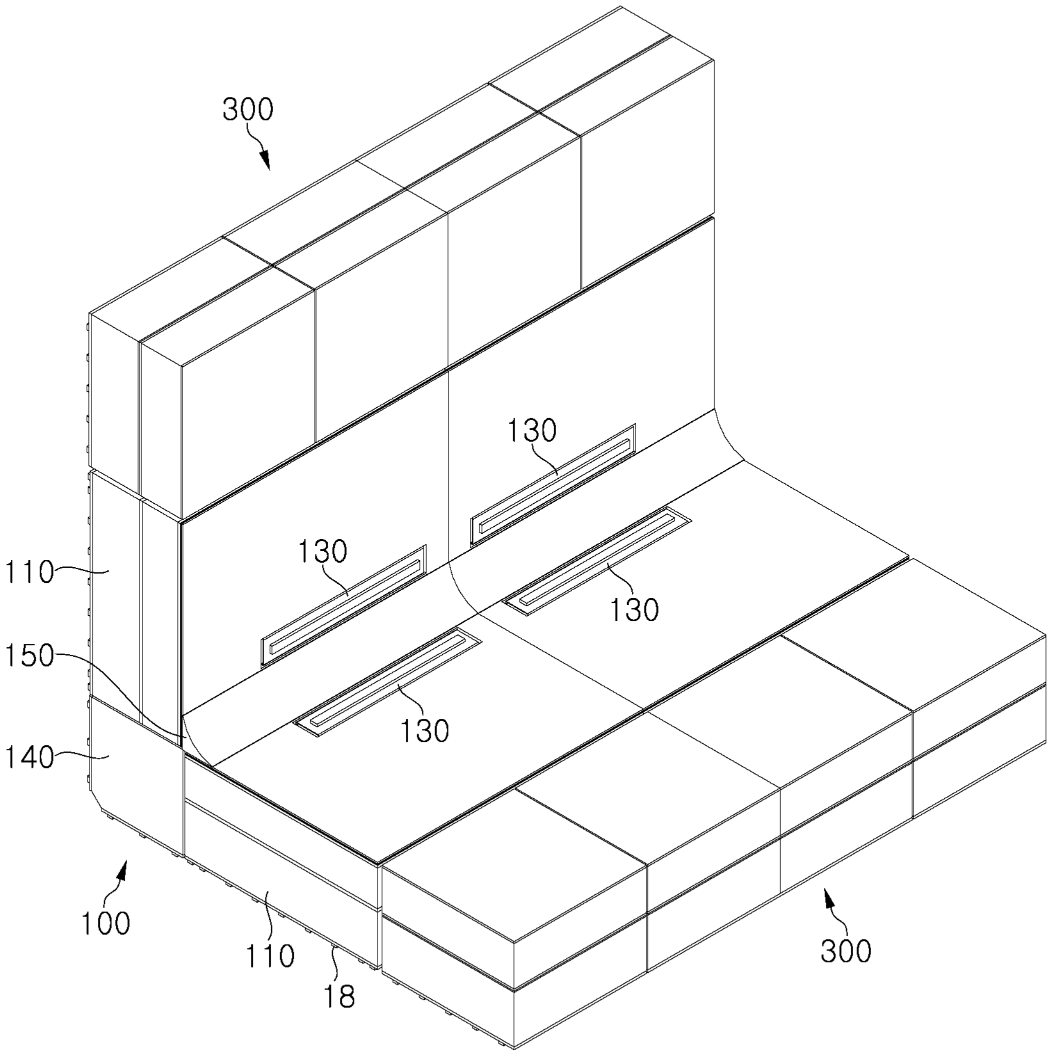
FIG. 9 is a perspective view illustrating a movable member installed to be displaceable with respect to an insulating member of the corner structure according to an embodiment of the present disclosure.
Figure 10:
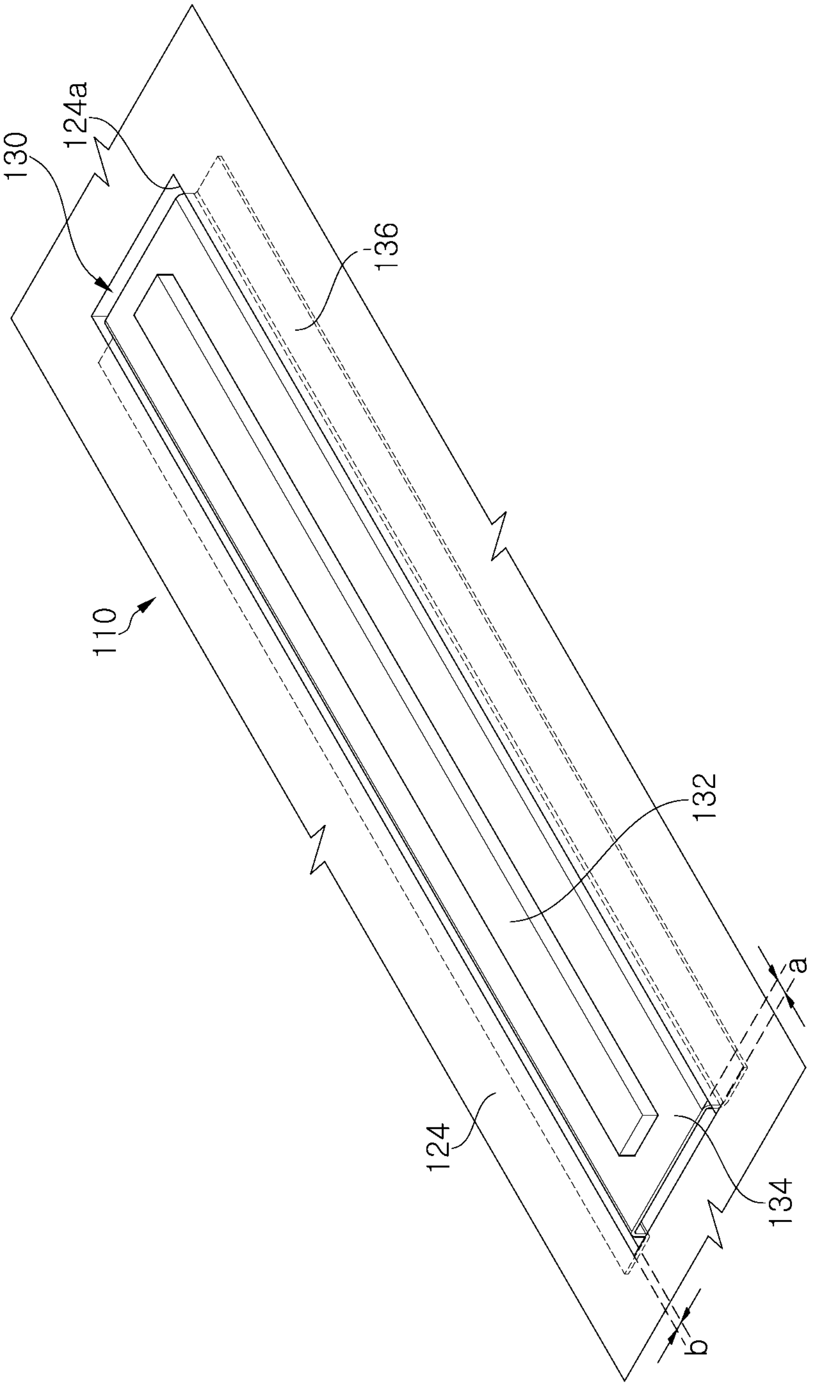
FIG. 10 is an enlarged perspective view of a movable member shown in FIG. 9.
Figure 11:
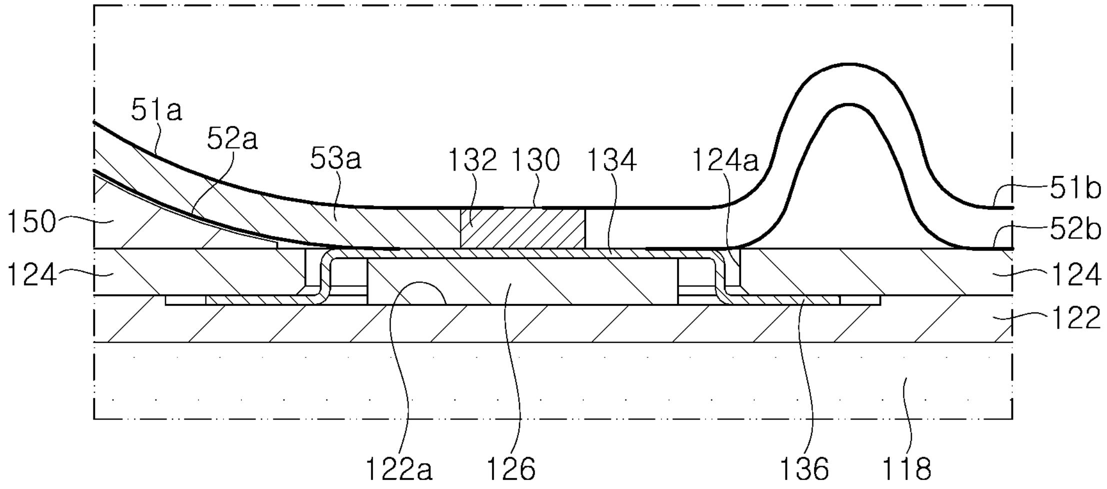
FIG. 11 is a cross-sectional view of a main portion illustrating a state in which primary and secondary membranes are bonded to a corner structure according to an embodiment of the present disclosure.

FIGS. 4 to 8 are cross-sectional views illustrating an assembly process of a corner structure according to an embodiment of the present disclosure, FIG. 9 is a perspective view illustrating a movable member installed to be displaceable with respect to an insulating member, FIG. 10 is a partially enlarged plan view illustrating a partially enlarged upper plate of the movable plate of the corner structure and the insulating member, and FIG. 11 is a cross-sectional view of a main portion of the corner structure to which the primary and secondary membranes are attached.

The corner structure 100 according to an embodiment of the present disclosure may be manufactured as a single module by integrally adhering the movable member 130 to the insulating member 110. The insulating member 110 to which the movable member 130 is adhered may be manufactured at a site where a vessel having a storage tank is built or may be manufactured as a module in a nearby or remote factory and then transported to the site.

As shown in FIGS. 4, 10 and 11, the movable member 130 may be slidably coupled to the upper plates 122 and 124 of the insulating member 110. Specifically, among the two upper plates, the first upper plate 122 (plywood of 15t) has a concave portion and the second upper plate 124 has an opening 124*a* a concave portion 122*a* in which the flange portion 136 of the movable member 130 may be seated, and an opening 124*a* into which the secondary joint portion 134 of the movable member 130 may be inserted is formed in the second upper plate 124 (plywood of 15t).

A length and width of the concave portion 122*a* are larger than a length and width of the movable member 130. A length of the opening 124*a* is larger than a length of the secondary joint portion 134 of the movable member 130. A width of the opening 124*a* is equal to or greater than a width of the secondary joint portion 134 of the movable member 130. As shown in FIG. 10, gaps a and b are formed between the opening 124*a* and the secondary joint portion 134 of the movable member 130. Further, as shown in FIG. 11, a gap is also formed between a side wall surface of the concave portion 122*a* and the flange portion 136 of the movable member 130.

Therefore, by sequentially stacking the first upper plate 122, the movable member 130 and the second upper plate 124 and fixing the first upper plate 122 to the second upper plate 124, the movable member 130 may be slidably interposed between the first upper plate 122 and the second upper plate 124.

A spacer 126 may be disposed between the secondary joint portion 134 of the movable member 130 and a bottom surface of the concave portion 122*a* of the first upper plate 122. The spacer 126 may be integrally formed with the first upper plate 122 or may be formed as a separate member. A gap is also formed between the spacer and the flange portion 136.

Figure 5:
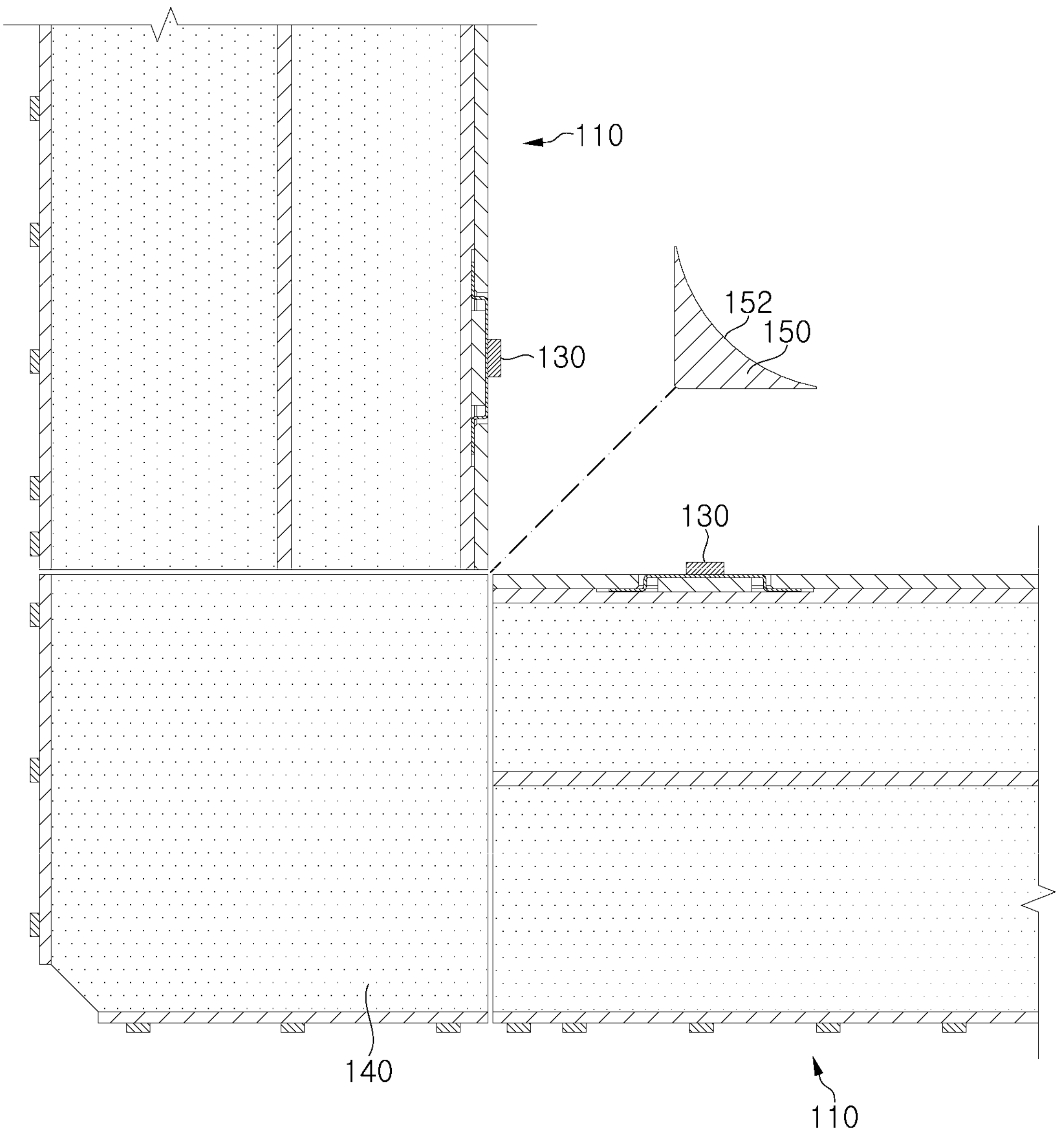

As shown in FIG. 5, the curved member 150 is located between the two insulating members 110. Both edges of the curved portion 152 of the curved member 150 are close to the movable member 130 but do not contact the movable member 130.

Figure 6:
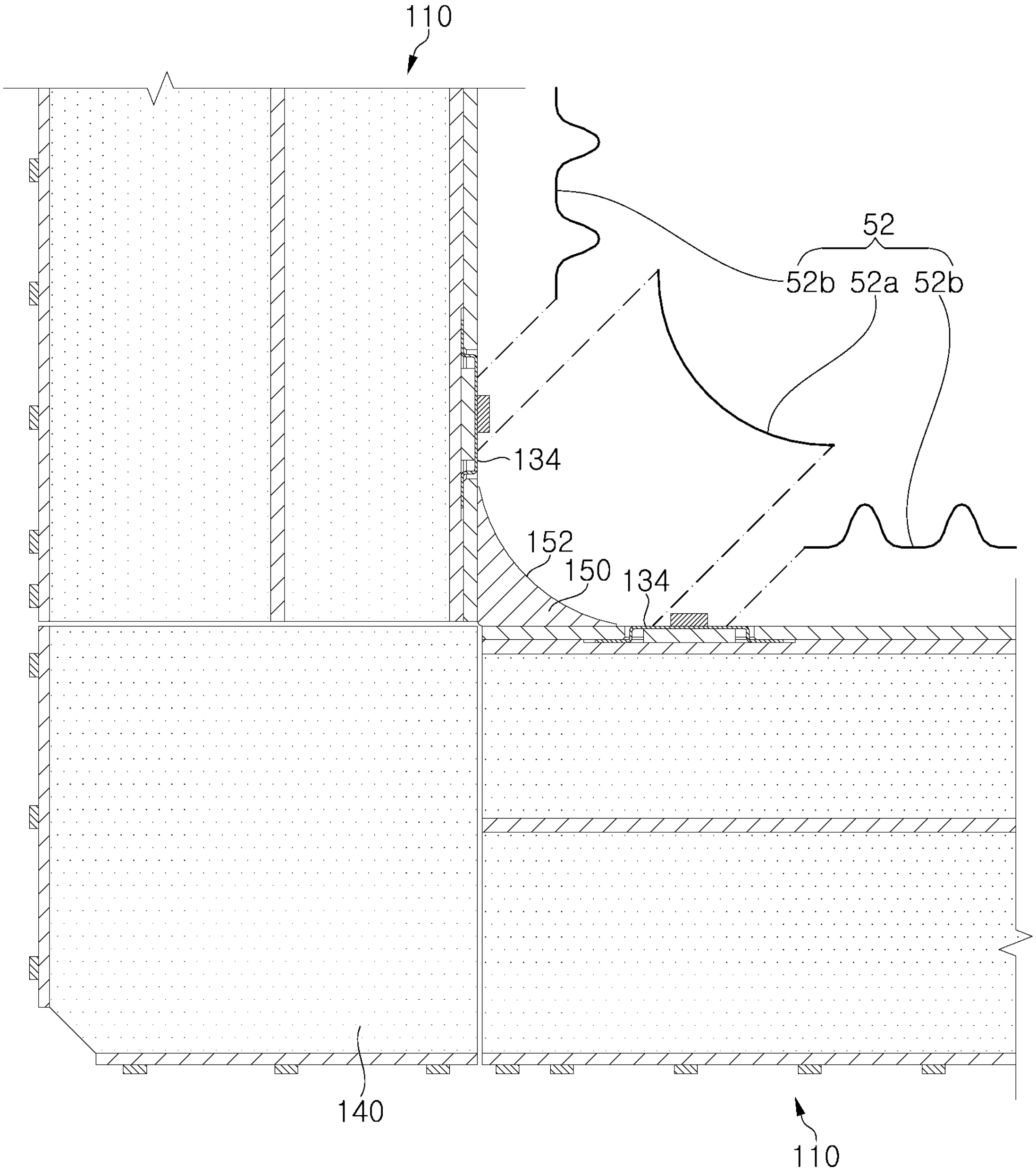

As illustrated in FIGS. 6 to 8, the secondary membrane 52, the support plate 53, and the primary membrane 51 may be sequentially stacked on the corner structure 100 according to an embodiment of the present disclosure.

The secondary membrane 52 is bonded to the secondary joint portion 134 of the movable member 130. The secondary membrane 52 may include, for example, a secondary curved portion 52*a* that is bent at 90 degrees and a secondary flat portion 52*b* formed to have a flat plate shape. The secondary curved portion 52*a* extends between two movable members 130 disposed on different insulating members 110, and a cross-section thereof has a substantially circular arc-shape and curved to be rounded so that the secondary curved portion 52*a* may be seated on the curved portion 152 of the curved member 150. The secondary flat portion 52*b* may have wrinkles to respond to thermal deformation of the membrane.

The support plate 53 is laminated on the secondary membrane 52. Like the secondary membrane, the support plate 53 may include, for example, a curved portion support plate 53*a* that is bent at 90 degrees and a flat support plate 53*b* formed to have a flat plate shape. The secondary curved portion 52*a* extends between two movable members 130 disposed on different insulating members 110, and a cross-section thereof has a substantially circular arc-shape and curved to be rounded so that the secondary curved portion 52*a* may be seated on the curved portion 152 of the curved member 150. The curved portion support plate 53*a* may be formed of reinforced-polyurethane foam.

The primary membrane 51 is bonded to the primary joint portion 132 of the movable member 130. Like the secondary membrane, the primary membrane 51 may include, for example, a primary curved portion 51*a*, which is a portion bent at 90 degrees, and the secondary flat portion 52*b* formed to have a flat plate shape. The primary curved portion 51*a* extends between two movable members 130 disposed on different insulating members 110, and a cross-section thereof has a substantially circular arc-shape and curved to be rounded so that the primary curved portion 51*a* may be seated on the curved portion support plate 53*a*. The primary flat portion 51*b* may have wrinkles to respond to thermal deformation of the membrane.

The support plate 53 may be interposed over the entire portion, except for a portion in which the primary and secondary membranes 51 and 52 are arranged to be parallel to each other, that is, the portion in which the wrinkles are formed, but may also be interposed partially over the remaining portion except for the portion in which wrinkles are formed.

As the support plate 53, plywood having a certain thickness may be used alone, polyurethane foam (or reinforced polyurethane foam) having a certain thickness may be used alone, or polyurethane foam (or reinforced polyurethane foam) to which plywood is adhered may be used.

As shown in FIG. 9, a plurality of movable members, for example, two movable members 130, may be arranged in a straight line on a single insulating member 110. Accordingly, one corner structure 100 including two insulating members 110 oriented at a predetermined angle may have, for example, a total of four movable members 130. The movable members 130 arranged in a straight line on the single insulating member 110 may be connected by a sealing material in the form of a sheet, such as a triplex, for example.

As described above, the movable member 130 is formed by adhering the primary joint portion 132 to which the primary membrane 51 is bonded to the secondary joint portion 134 to which the secondary membrane 52 is bonded. When the primary joint portion 132 and the secondary joint portion 134 are joined by welding, at least one of the primary joint portion 132 and the secondary joint portion 134 of the movable member 130 may be twisted to be deformed by heat generated during welding.

Here, when arranging two movable members in a straight line for one insulating member 110, the length of the movable member 130 may be shortened, compared to arranging one long movable member for one insulating member 110, thereby reducing the amount of deformation. Furthermore, the overall weight of the movable member used in the corner structure may be reduced.

In the case of installing one movable member which is relatively long for one insulating member 110, for example, the movable member may have a length of 1800 mm and a deformation amount due to welding reaches 7 to 8 mm. In contrast, when two relatively short movable members are installed in a straight line for one insulating member 110, for example, each movable member has a length of 500 to 760 mm and the amount of deformation due to welding is only about 1 to 1.5 mm.

In addition, when one movable member which is relatively long is installed for one insulating member 110, a total weight of the two movable members used in one corner structure reaches 33.4 kg. In contrast, when two relatively short movable members are installed in a straight line for one insulating member 110, a total weight of the movable members (four movable members) used in one corner structure is only 24 to 28 kg.

In this manner, when two or more movable members 130 are arranged and installed in a straight line with respect to one insulating member 110, the amount of deformation that may occur during manufacturing of the movable member 130 may be reduced and at the same time the total weight of the movable member 130 used in one corner structure may be reduced, and thus, a lightweight and precise corner structure may be formed.

Meanwhile, as described above, when loading and unloading cargo or when an external force is generated at sea, relative displacement may occur between the movable member 130 and the insulating member 110 relative to each other due to deformation of the hull or membrane. As shown in FIGS. 10 and 11, since a size of the concave portion 122*a* formed in the first upper plate 122 of the insulating member 110 is larger than a size of the flange portion 136 of the movable member 130 and a size of the opening 124*a* formed in the second upper plate 124 of the insulating member 110 is larger than a size of the secondary joint portion 134 of the movable member 130, even if displacement occurs, the displacement may be absorbed.

In addition, when the membranes 51 and 52 shrink due to thermal deformation generated during shipment of liquefied gas, the movable member 130 to which the membranes 51 and 52 are bonded may also shrink together. At this time, both ends of the movable member 130 may be displaced while sliding finely toward the central portion of the movable member. As described above, since the flange portion 136 of the movable member 130 is slidably interposed between the first upper plate 122 and the second upper plate 124, the coupling state of the movable member 130 to the insulating member 110 may be maintained continuously even when the movable member 130 contracts and expands.

As described above, the storage tank 10 is sealed in a liquid-tight state by the first and secondary membranes 51 and 52. That is, the storage tank 10 forms one storage space surrounded by a two-ply sealing wall by integrally connecting a plurality of metal plates to each other by welding, and accordingly, the storage tank 10 may store and transport liquefied gas without leakage.

As is well known, the primary membrane 51 in direct contact with liquefied gas, such as LNG in a cryogenic state, and the secondary membrane 52 installed to be spaced apart from the primary membrane 51 have wrinkles formed to respond to changes in temperature according to loading and unloading of the liquefied gas. The shape and size of the primary membrane 51 and the secondary membrane 52, including the wrinkles, are not limited to those shown in the drawings.

These primary and secondary membranes 51 and 52 may be indirectly connected to the hull structure walls 12 and 14 of the vessel through a plurality of corner structures 100 and anchor structures (not shown).

Referring back to FIGS. 2 and 3, the planar structure 300 may be arranged around the corner structure 100. Compared to the insulation member 110 of the corner structure 100 described above, the planar structure 300 is different in that it has a structure in which a primary insulating panel 310 and a secondary insulating panel 320 are stacked.

As shown in FIGS. 2 and 3, the planar structure 300 according to an embodiment of the present disclosure for forming an insulating wall may include a primary insulating panel 310 and a secondary insulating panel 320, and the primary insulating panel 310 and the secondary insulating panel 320 may be bonded to each other by, for example, PU bonding to be integrated.

The primary insulating panel 310 and the secondary insulating panel 320 of the planar structure 300 may be formed of, for example, an insulation material of polyurethane foam and plywood. More specifically, the primary insulating panel 310 of the planar structure 300 located closer to the sealing wall may include, for example, a primary insulator 314 formed of polyurethane foam, etc., and a primary upper plate 312 and a primary lower plate 316 bonded to the upper and lower surfaces of the primary insulator 314, respectively. Adhesion between the primary insulator 314 and the primary upper and lower plates 312 and 316 may be achieved by, for example, PU bonding.

In addition, the secondary insulating panel 320 of the planar structure 300 located to be closer to the hull structure wall may include, for example, a secondary insulator 324 formed of polyurethane foam or the like and a secondary upper plate 322 and a secondary lower plate 326 laminated on upper and lower surfaces of the secondary insulator 324.

According to the present disclosure, by manufacturing the planar structure 300 to have a two-layer structure by bonding the primary insulating panel 310 and the secondary insulating panel 320, heat inflow from the outside to the inside of the storage tank may be better blocked.

The planar structure 300 formed by bonding the primary insulating panel 310 and the secondary insulating panel 320 to each other is modularized and pre-manufactured in a factory in advance, and each modular unit planar structure is transported to the site and then mounted on the hull structure wall to manufacture a storage tank.

A protective layer (not shown) of a glass wool material for protecting the primary insulator 314 and the secondary insulator 324 may be laminated on the side surface of the planar structure 300. A space between the corner structure 100 and the planar structure 300 may be filled with an insulating material, such as glass wool, or the like.

In the above, in order to reinforce the secondary insulator 324 of the planar structure 300, the use of reinforcing plates arranged in parallel has been described, but modification may be made such that an insulation box formed of plywood may be used or reinforcing plates may be arranged in a grid form. In addition, the planar structure 300 may be formed of a single layer of insulator, similar to the aforementioned middle insulator 140, instead of having a two-layer structure of a primary insulator and a secondary insulator.

The mastic 18 may be interposed between the planar structure 300 and the hull structure walls 12 and 14. The planar structure 300 according to the present embodiment may have a fixing structure for fixing the planar structure 300 to the hull structure walls 12 and 14, for example, mechanical fixing members (not shown), such as stud bolts and nuts.

An anchor unit (not shown) may be mounted at the center of the upper surface of the planar structure 300 to support the sealing wall. When the planar structure 300 includes an anchor unit, the planar structure having the anchor unit may function as an anchor structure. When manufacturing the liquefied gas storage tank, if necessary, the anchor structure and the planar structure may be properly arranged and mounted on the hull structure wall.

Like the insulating member 110 of the corner structure 100, the planar structure 300 may be modularized and pre-manufactured in a factory in advance, and each modular unit planar structure may be transported to the site, and then mounted on the hull structure wall for manufacturing a storage tank.

Each of the corner structure 100, anchor structure, and planar structure arranged in the storage tank 10 may be manufactured as one module in a separate location, and then transferred to the storage tank 10 and assembled. Due to modularization, workability may be improved when manufacturing a storage tank.

The primary and secondary membranes 51 and 52 are supported by corner structure 100 and anchor structure, and the planar structure only support a load of LNG applied to the primary and secondary membranes 51 and 52. In addition, it may be configured so that there is no direct coupling relationship between the planar structure and the corner structure 100 or between the planar structure and the anchor structure.

As described above, according to an embodiment of the present disclosure, the primary membrane 51 and the secondary membrane 52 are spaced apart from each other, and only the support plate 53 is interposed therebetween and an insulator is not interposed therebetween. Since most conventional insulation barrier structures have a primary insulating wall interposed between a primary sealing wall and a secondary sealing wall in direct contact with LNG, a complicated structure is required to support the primary sealing wall by the secondary sealing wall through the primary insulating wall. In contrast, the corner structure 100 according to the present disclosure is configured not to interpose an insulator performing a separate insulating function between the primary and secondary membranes 51 and 52, the primary and secondary membranes 51 and 52 may be relatively easily supported by the primary and secondary joint portions of the movable member 130.

In addition, according to the present disclosure, since the primary membrane 51 and the secondary membrane 52 are spaced apart from each other, even if the shape of the storage tank is deformed due to deformation of the hull due to external forces, such as waves, friction does not occur between the first and secondary membranes 51 and 52 and even if damage occurs due to an impact applied to one membrane, it is possible to prevent the damage from being directly propagated to the other membrane.

Meanwhile, although the sealing is described as having a double structure by the primary and secondary membranes 51 and 52, it is also possible to laminate three or more layers to form a multilayer structure.

In addition, according to the present disclosure, the movable member 130 to which the primary and secondary membranes 51 and 52 are bonded is finely slidably connected to the insulating member 110 as described above, so that the primary and secondary membranes 51 and 52 may be stably supported with respect to the hull. Accordingly, stress caused by thermal deformation due to loading and unloading of LNG or deformation of the hull due to external forces, such as waves, may be reliably absorbed.

Figure 12:
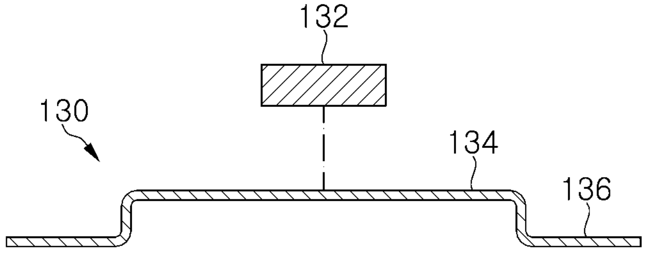
FIG. 12 is a cross-sectional view illustrating various embodiments of a movable member.
Figure 12:
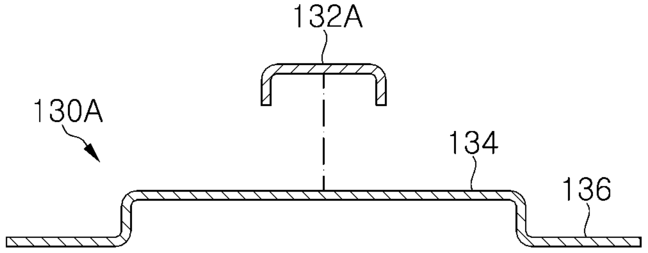

As shown in FIG. 12, the primary joint portion of the movable member 130 may be formed of a metal rod having a rectangular cross-section or a bent metal plate. (a) of FIG. 12 illustrates a cross-sectional view before assembly of the movable member 130 having the primary joint portion 132 formed of a metal rod, and (b) of FIG. 12 illustrates a cross-sectional view before assembly of a movable member 130A having a primary joint portion 132A formed of a U-shaped section steel formed by bending a sheet of metal plate.

Figure 13:
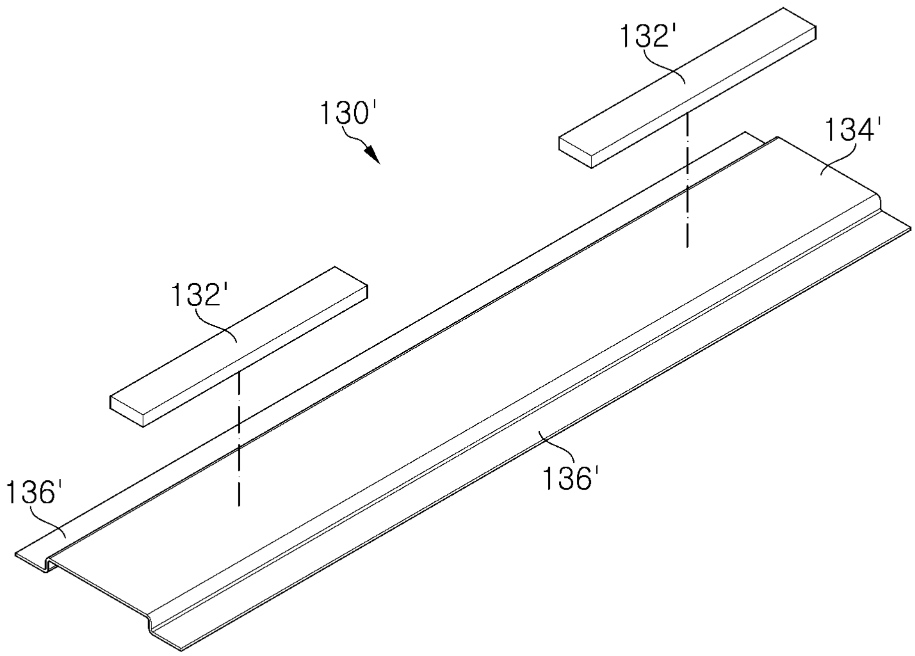
FIG. 13 is a perspective view illustrating various embodiments of a movable member.
Figure 13:
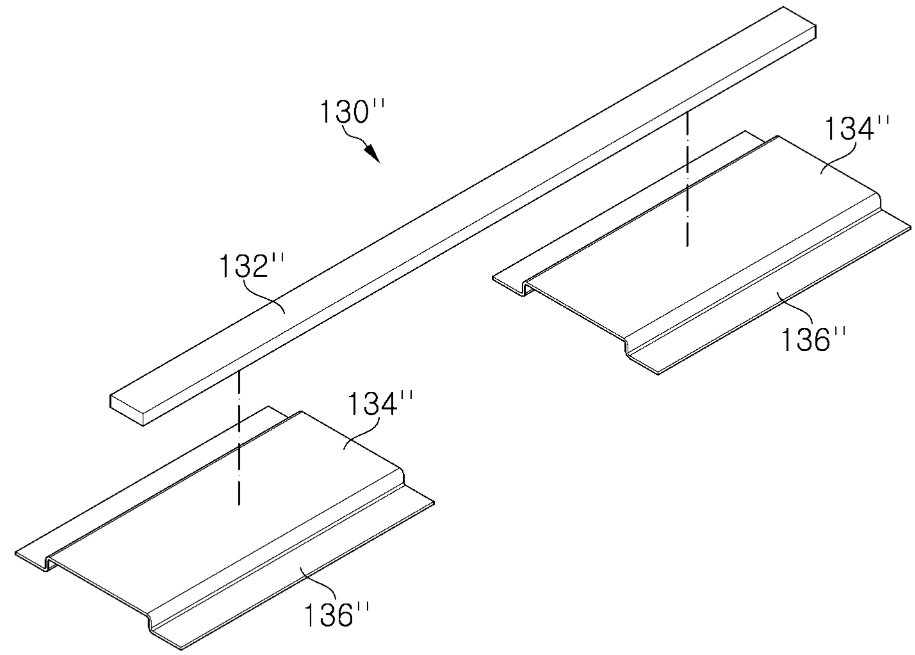

In addition, the movable member according to the present disclosure may be deformed as shown in FIG. 13. In (a) of FIG. 13, a first modification of a movable member 130' in which two relatively short primary joint portions 132' are arranged and bonded in a straight line at intervals on one relatively long secondary joint portion 134' is illustrated. A flange portion 136' may have the same length as the length of the secondary joint portion 134'.

In (b) of FIG. 13, a second modification of a movable member 130" in which one relatively long primary joint portion 132" is bonded to two relatively short secondary joint portions 134". Unlike the movable member 130' of the first modification, in the movable member 130" of the second modification, two secondary joint portions 134" are arranged to be spaced apart from each other in a straight line and bonded to the one primary joint portion 132". A flange portion 136" may have the same length as a length of the secondary joint portion 134".

FIG. 14 is a cross-sectional view of a corner structure according to another embodiment of the present disclosure. A corner structure 100A shown in FIG. 14 includes the movable member 130 having the same configuration as that of the movable member 130 included in the corner structure 100 shown in FIG. 3. In addition, the corner structure 100A of FIG. 14 is the same as the corner structure 100 of FIG. 3 in that the movable member 130 is coupled to be slidably displaced with respect to an insulating member 110A and that a plurality of movable members 130 are arranged in a straight line at intervals with respect to one insulating member 110A. However, the corner structure 100A of FIG. 14 has a difference in structure of the insulating member, compared to the corner structure 100 of FIG. 3.

Hereinafter, differences between the corner structure 100A of FIG. 14 and the corner structure 100 of FIG. 3 will be mainly described. In the corner structure 100A of FIG. 14, the same reference numerals are assigned to components identical or similar to those of the corner structure 100 of FIG. 3, and detailed descriptions thereof are omitted.

The corner structure 100A of FIG. 14 is different from the corner structure 100 of FIG. 3 in that a middle plate does not exist between an upper insulator 118A and a lower insulator 114A of the insulation member 110A. Accordingly, the upper insulator 118A and the lower insulator 114A may be in direct contact. In addition, a size of the upper insulator 118A and a size of the lower insulator 114A may be different. For example, in the corner structure 100A of FIG. 14, the upper insulator 118A is larger than the lower insulator 114A, so that a portion of the upper insulator 118A may protrude from an end surface of the lower insulator 114A.

The corner structure 100A of FIG. 14 may have a first upper plate 122A smaller than a size of the second upper plate 124A. For example, in the corner structure 100A of FIG. 14, the first upper plate 122A may have a size sufficient for covering the entire surface of the upper insulator 118A, but may be installed only in a portion necessary for coupling of the movable member 130.

Meanwhile, referring to FIG. 14, the planar structure 300A is different from the planar structure 300 shown in FIG. 3. The planar structure 300A of FIG. 14 has an upper insulator 314A and a lower insulator 324A, and no plate formed of plywood material exists between the upper insulator 314A and the lower insulator 324A. Accordingly, the upper insulator 314A and the lower insulator 324A may directly contact each other. A size of the upper insulator 314A and a size of the lower insulator 324A of the planar structure 300A may be different. For example, in the planar structure 300A of FIG. 14, the upper insulator 314A may be smaller than the lower insulator 324A.

For convenience of illustration, in FIG. 14, the first and secondary membranes 51 and 52 are shown only on the corner structure 100A, and are omitted in the planar structure 300A.

FIG. 15 is a cross-sectional view of a corner structure according to another embodiment of the present disclosure. A corner structure 100B shown in FIG. 15 includes the movable member 130 having the same configuration as that of the movable member 130 included in the corner structure 100 shown in FIG. 3. In addition, the corner structure 100B of FIG. 15 is the same as the corner structure 100 of FIG. 3 in that the movable member 130 is coupled to be slidably displaced with respect to an insulating member 110B and that a plurality of movable members 130 are arranged in a straight line at intervals with respect to one insulating member 110B. However, the corner structure 100B of FIG. 14 has a difference in structure of the insulating member, compared to the corner structure 100 of FIG. 3.

Hereinafter, differences between the corner structure 100B of FIG. 15 and the corner structure 100 of FIG. 3 will be mainly described. In the corner structure 100B of FIG. 15, the same reference numerals are assigned to components identical or similar to those of the corner structure 100 of FIG. 3, and detailed descriptions thereof are omitted.

In the corner structure 100 of FIG. 3, the middle insulator 140 is arranged between the two insulating members 110B, but the corner structure 100B of FIG. 15 does not use the middle insulator, and the shape of the insulating members 110B is deformed to directly contact each other. For example, as shown in FIG. 15, when two insulating members 110B are oriented at an angle of 90 degrees, a side surface in which two insulating members 110B contact each other may be formed as an inclined surface 110Ba at an angle of about 45 degrees.

The corner structure 100B of FIG. 15 is different from the corner structure 100 of FIG. 3 in that there is no middle plate between the upper insulator 118B and the lower insulator 114B of the insulation member 110B. Accordingly, the upper insulator 118B and the lower insulator 114B may be in direct contact. In addition, the size of the upper insulator 118B and the size of the lower insulator 114B may be different. For example, in the corner structure 100B of FIG. 15, the upper insulator 118B is smaller than the lower insulator 114B, so a portion of the lower insulator 114B may protrude from an end surface of the upper insulator 118B.

In addition, the corner structure 100B of FIG. 15 may include an upper auxiliary insulator 117B and a lower auxiliary insulator 115B arranged between the insulating member 110B and the planar structure 300B (that is, arranged on the opposite sides of the two insulating members 110B in an adjacent direction). The lower auxiliary insulation material 115B may be arranged between a lower insulator 114B and the planar structure 300B, and the upper auxiliary insulator 117B may be arranged between the upper insulator 118B and the planar structure 300B. For example, in the corner structure 100B of FIG. 15, the upper secondary insulator 117B may be larger than the lower secondary insulator 115B.

In the corner structure 100B of FIG. 15, the first upper plate 122B and the second upper plate 124B may have substantially the same size.

Meanwhile, referring to FIG. 15, the planar structure 300B is different from the planar structure 300 shown in FIG. 3. The planar structure 300B of FIG. 15 includes an upper insulator 314B and a lower insulator 324B, and a plate formed of a plywood material does not exist between the upper insulator 314B and the lower insulator 324B. Accordingly, the upper insulator 314B and the lower insulator 324B may directly contact each other. A size of the upper insulator 314B and a size of the lower insulator 324B of the planar structure 300B may be different. For example, in the planar structure 300B of FIG. 15, the upper insulator 314B may be smaller than the lower insulator 324B.

For convenience of illustration, in FIG. 15, the primary and secondary membranes 51 and 52 are shown only on the corner structure 100B and are omitted in the planar structure 300B.

The planar structure 300B shown in FIG. 15 may be the same as the planar structure 300A shown in FIG. 14.

The insulator, insulating member, or insulating material used in the above embodiment of the present disclosure may include, for example, glass wool, mineral wool, polyester filler, polyurethane foam, melanin foam, polyethylene foam, polypropylene foam, silicone foam, polyvinyl chloride foam, or the like.

Further, in the above embodiment of the present disclosure, it is described that the membrane is formed of, for example, corrugated stainless steel used in GTT Mark-III type, but the membrane may also be formed of, for example, Invar steel used in No. 96 of GTT.

In addition, of course, the present disclosure may be equally applied to liquefied gas storage tanks installed on land as well as liquefied gas storage tanks installed inside the hull of vessels.

The invention claimed is:

1. A corner structure of a liquefied gas storage tank installed at a corner of a storage tank for loading liquefied gas, the corner structure comprising:

two insulating members disposed on an inner surface of a hull structure wall to be oriented in different directions;

a sealing wall preventing leakage of liquefied gas; and a movable member installed on each of the insulating members and to which the sealing wall is attached, wherein the movable member is coupled to be slidably displaced with respect to the each of the insulating members, a plurality of the movable members are arranged in a straight line at intervals from each other with respect to the each of the insulating members, the sealing wall includes a primary membrane and a secondary membrane, the movable member includes a primary joint portion to which the primary membrane is attached, a secondary joint portion formed to have a step difference from the primary joint portion, to which the secondary membrane is attached, and a flange portion extending from the secondary joint portion for coupling with the each of the insulating members, the flange portion is slidably interposed between upper plates of the each of the insulating members formed of two sheets of plywood, so that the each of the insulating members and the movable member are combined to be relatively slidably displaceable, and the secondary joint portion and the flange portion are formed by bending a sheet of metal, and the primary joint portion is formed by adhering a metal rod having a rectangular cross-section or a U-shaped section steel formed by bending a sheet of metal to the secondary joint portion.

2. The corner structure of claim 1, wherein the each of the insulating members includes a lower plate and an upper plate having a flat plate shape; a lower insulator laminated on the lower plate; and an upper insulator interposed between the lower insulator and the upper plate, wherein the upper insulator and the lower insulator are formed of an insulator of the same material.

3. The corner structure of claim 2, wherein the lower insulator has a density lower than or equal to a density of the upper insulator.

4. The corner structure of claim 2, further comprising:

a middle insulator disposed in a space surrounded by two insulating members oriented in different directions and the hull structure wall, wherein the middle insulator has a density lower than or equal to a density of the upper insulator and the lower insulator.

5. The corner structure of claim 1, further comprising a middle insulator disposed in a space surrounded by two insulating members oriented in different directions and the hull structure wall.

6. The corner structure of claim 1, further comprising a curved member disposed between the upper plates of the two insulating members to support the sealing wall and having a curved surface facing an inside of the storage tank.

7. The corner structure of claim 1, wherein among the two sheets of plywood, a first plywood located on a lower side includes a concave portion in which the flange portion is seated, and a second plywood located above the first plywood includes an opening through which the primary joint portion and the secondary joint portion pass, and the flange portion is interposed between the first plywood and the second plywood in the concave portion.

8. The corner structure of claim 7, wherein a length and width of the concave portion are greater than or equal to a length and width of the flange portion, and a length and width of the opening portion are greater than a length and width of the secondary joint portion.

9. A liquefied gas storage tank including a corner structure installed at a corner, wherein the corner structure comprises:

two insulating members disposed on an inner surface of a hull structure wall to be oriented in different directions;

a sealing wall preventing leakage of liquefied gas; and a movable member installed on each of the insulating members and to which the sealing wall is attached, wherein the movable member is coupled to be slidably displaced with respect to the each of the insulating members, a plurality of the movable members are arranged in a straight line at intervals from each other with respect to the each of the insulating members, the sealing wall includes a primary membrane and a secondary membrane, the movable member includes a primary joint portion to which the primary membrane is attached, a secondary joint portion formed to have a step difference from the primary joint portion, to which the secondary membrane is attached, and a flange portion extending from the secondary joint portion for coupling with the each of the insulating members, the flange portion is slidably interposed between upper plates of the each of the insulating members formed of two sheets of plywood, so that the each of the insulating members and the movable member are combined to be relatively slidably displaceable, and the secondary joint portion and the flange portion are formed by bending a sheet of metal, and the primary joint portion is formed by adhering a metal rod having a rectangular cross-section or a U-shaped section steel formed by bending a sheet of metal to the secondary joint portion.

10. The liquefied gas storage tank of claim 9, wherein a planar structure is disposed around the corner structure, the planar structure includes a secondary insulating panel installed on the hull structure wall and a primary insulating panel adhered to the secondary insulating panel to be adjacent to the sealing wall, and a primary insulator included in the primary insulating panel and a secondary insulator included in the secondary insulating panel are formed of an insulator of the same material, and the secondary insulator has a density lower than or equal to a density of the primary insulator.

11. The liquefied gas storage tank of claim 9, wherein the primary membrane is in direct contact with liquefied gas and the secondary membrane is installed to be spaced apart from the primary membrane by a predetermined distance, and a support plate is interposed between the primary membrane and the secondary membrane to maintain a constant interval therebetween.

* * * * *